(12) United States Patent
Brown et al.

(10) Patent No.: US 11,848,425 B2
(45) Date of Patent: Dec. 19, 2023

(54) TEMPERATURE CONTROL FOR ENERGY STORAGE SYSTEM

(71) Applicant: General Electric Company, Schenectady, NY (US)

(72) Inventors: Keith Garrette Brown, Niskayuna, NY (US); Honggang Wang, Clifton Park, NY (US); Alistair Martin Waddell, Bavaria (DE)

(73) Assignee: General Electric Company, Schenectady, NY (US)

( * ) Notice: Subject to any disclaimer, the term of this patent is extended or adjusted under 35 U.S.C. 154(b) by 409 days.

(21) Appl. No.: 16/755,835

(22) PCT Filed: Oct. 12, 2018

(86) PCT No.: PCT/US2018/055558
§ 371 (c)(1),
(2) Date: Apr. 13, 2020

(87) PCT Pub. No.: WO2019/075293
PCT Pub. Date: Apr. 18, 2019

(65) Prior Publication Data
US 2021/0194421 A1 Jun. 24, 2021

Related U.S. Application Data

(60) Provisional application No. 62/587,015, filed on Nov. 16, 2017, provisional application No. 62/576,880, (Continued)

(51) Int. Cl.
*H02S 40/42* (2014.01)
*H02S 40/38* (2014.01)
(Continued)

(52) U.S. Cl.
CPC ........ *H01M 10/425* (2013.01); *B65D 88/121* (2013.01); *B65D 88/74* (2013.01); (Continued)

(58) Field of Classification Search
CPC ...... H02S 40/345; H02S 40/425; H02S 40/42; H02S 40/38; H01L 31/052; H01M 10/61; (Continued)

(56) References Cited

U.S. PATENT DOCUMENTS 11,085,969 B2 * 8/2021 Drees .................. G01R 31/389
2007/0188137 A1 * 8/2007 Scheucher ............ H02J 7/0063
320/116
(Continued)

FOREIGN PATENT DOCUMENTS

CN 103138340 A 6/2013
CN 103532158 A 1/2014
(Continued)

OTHER PUBLICATIONS

F.A. Wyczalek, "Heating and Cooling Battery Electric Vehicles—The Final Barrier", IEEE Aerospace and Electronic Systems Magazine, http://ieeexplore.ieee.org/document/242054/, vol. 08, Issue 11, pp. 9-14, Nov. 1993.
(Continued)

*Primary Examiner* — Richard Isla
*Assistant Examiner* — Sadia Kousar
(74) *Attorney, Agent, or Firm* — Armstrong Teasdale LLP

(57) ABSTRACT

An energy storage system includes a DC bus; a plurality of battery strings, each battery string comprising batteries coupled electrically together; a plurality of DC/DC converters electrically coupling respective battery strings to the DC bus; an enclosure housing the battery strings and the DC/DC converters; and a temperature control system. The temperature control system includes at least one heating, ventilation,
(Continued)

and air conditioning (HVAC) system, and a controller. The controller is programmed to execute a method of predicting heat loads for respective battery strings within the enclosure, wherein the heat loads comprise external heat loads and internal heat loads; determining one or both of DC/DC converter operating commands and HVAC operating commands based on the respective predicted heat loads to control the actual heat loads of the respective battery strings; and operating one or both of the DC/DC converter and the HVAC system in response to at least one of the DC/DC converter operating commands and the HVAC operating commands.

23 Claims, 10 Drawing Sheets

Related U.S. Application Data filed on Oct. 25, 2017, provisional application No. 62/571,324, filed on Oct. 12, 2017.

(51) Int. Cl.

| | | |
|---|---|---|
| *H02S 30/10* | (2014.01) | |
| *B65D 88/12* | (2006.01) | |
| *B65D 88/74* | (2006.01) | |
| *H01M 10/42* | (2006.01) | |
| *H01M 10/613* | (2014.01) | |
| *H01M 10/63* | (2014.01) | |
| *H01M 10/6563* | (2014.01) | |
| *H01M 10/48* | (2006.01) | |
| *H02J 7/00* | (2006.01) | |
| *H01M 50/204* | (2021.01) | |

(52) U.S. Cl.
CPC ....... *H01M 10/482* (2013.01); *H01M 10/486* (2013.01); *H01M 10/613* (2015.04); *H01M 10/63* (2015.04); *H01M 10/6563* (2015.04); *H01M 50/204* (2021.01); *H02J 7/007* (2013.01); *H02S 30/10* (2014.12); *H02S 40/38* (2014.12); *H02S 40/42* (2014.12); *H02J 7/007194* (2020.01)

(58) Field of Classification Search
CPC .... H01M 10/60; H01M 10/613; H01M 10/63; H01M 10/6563; H01M 10/482; H01M 10/486; H02J 7/007192; H02J 7/007194
See application file for complete search history.

(56) References Cited

U.S. PATENT DOCUMENTS

| | | | |
|---|---|---|---|
| 2008/0213652 A1 | 9/2008 | Scheucher | |
| 2009/0249807 A1 | 10/2009 | Nemesh et al. | |
| 2011/0228471 A1 | 9/2011 | Humphrey et al. | |
| 2011/0273016 A1 | 11/2011 | Adest et al. | |
| 2012/0021258 A1 | 1/2012 | Kelty et al. | |
| 2012/0167607 A1* | 7/2012 | Callender | F25D 31/00 62/259.3 |
| 2012/0206093 A1 | 8/2012 | Schaefer et al. | |
| 2013/0166119 A1 | 6/2013 | Kummer | |
| 2013/0175022 A1 | 7/2013 | King | |
| 2013/0237138 A1 | 9/2013 | Matsuda et al. | |
| 2013/0269911 A1 | 10/2013 | Carpenter | |
| 2013/0298583 A1 | 11/2013 | O'Donnell | |
| 2014/0034287 A1 | 2/2014 | Buford | |
| 2014/0038007 A1 | 2/2014 | Ahn | |
| 2016/0023532 A1 | 1/2016 | Gauthier | |
| 2016/0107503 A1 | 4/2016 | Johnston | |
| 2016/0159466 A1* | 6/2016 | Daggett | B64C 23/06 244/130 |
| 2016/0176312 A1 | 6/2016 | Duhaime et al. | |
| 2016/0181835 A1 | 6/2016 | Gross | |
| 2017/0062885 A1 | 3/2017 | Cutright et al. | |
| 2017/0106718 A1 | 4/2017 | Nakano et al. | |
| 2017/0248338 A1 | 8/2017 | Ray | |
| 2017/0366023 A1* | 12/2017 | Tanaka | H01M 10/425 |
| 2019/0265387 A1* | 8/2019 | Tyagi | G06N 7/005 |

FOREIGN PATENT DOCUMENTS

| | | | | |
|---|---|---|---|---|
| CN | 105048021 A | 11/2015 | | |
| CN | 204992614 U | 1/2016 | | |
| CN | 105789719 A | 7/2016 | | |
| CN | 105990875 A | 10/2016 | | |
| DE | 102012208980 A1 | 1/2013 | | |
| EP | 2797158 A1 * | 10/2014 | .......... H01M 10/482 | |
| EP | 3247016 A1 * | 11/2017 | ............ G06Q 50/06 | |
| JP | 2011101553 A | 5/2011 | | |
| JP | 5932190 B1 | 6/2016 | | |
| KR | 20150067842 A | 6/2015 | | |
| KR | 20170010621 A | 2/2017 | | |
| WO | 2016113925 A1 | 7/2016 | | |
| WO | WO-2016113925 A1 * | 7/2016 | ............ G06Q 50/06 | |
| WO | 2016132586 A1 | 8/2016 | | |

OTHER PUBLICATIONS

Steffke et al., "Li-ion Air-Cooled Battery System Interactions With the Vehicle HVAC System", SAE Technical Paper, http://papers.sae.org/2013-01-0242/, pp. 10, Aug. 4, 2013.
Wei et al., "Battery Management and Application for Energy-Efficient Buildings", Design Automation Conference, http://ieeexplore.ieee.org/abstract/document/6881463/, Jun. 1-5, 2014.
International Search Report and Written Opinion, dated Dec. 13, 2018, for related International patent application No. PCT/US2018/055558.
Office Action and Search Report issued in Chinese Patent Application No. 201880080548.8, dated Dec. 27, 2022, 11 pages.
Xie et al., "Adaptive Thermal Management for Portable System Batteries by Forced Convection Cooling", Design, Automation & Test in Europe Conference & Exhibition (DATE), http://ieeexplore.ieee.org/document/6513700/, Mar. 18-22, 2013.
El-Ladan et al., "Fan-Pad Evaporative Battery Cooling For Hybrid Electric Vehicle Thermal Management", IET International Conference on Resilience of Transmission and Distribution Networks (RTDN), http://ieeexplore.ieee.org/document/7447264/, Sep. 22-24, 2015.
International Search Report and Written Opinion, dated Dec. 2, 2019, for related International application No. PCT/US2018/055560.

* cited by examiner

TEMPERATURE CONTROL FOR ENERGY STORAGE SYSTEM

CROSS-REFERENCE TO RELATED APPLICATIONS

This application is a National Stage Entry of PCT/US2018/055558, filed on Oct. 12, 2018, which claims the benefit of U.S. Provisional Patent Application No. 62/576,880, filed on Oct. 25, 2017; U.S. Provisional Patent Application No. 62/587,015, filed on Nov. 16, 2017; and U.S. Provisional Patent Application No. 62/571,324, filed on Oct. 12, 2017, which are all incorporated herein by reference.

BACKGROUND

The subject matter disclosed herein relates generally to temperature control of energy storage systems and more specifically to thermodynamic performance balancing of energy storage systems.

The worldwide demand for electrical energy has been increasing year by year. Much of the electrical energy demand is met by energy produced from conventional energy sources such as coal and gas. However, in recent years, there has been a push for electricity generation by renewable energy resources such as solar power and wind power.

Wind turbine generators are regarded as environmentally friendly and relatively inexpensive alternative sources of energy that utilize wind energy to produce electrical power. Further, solar power generation uses photovoltaic (PV) modules to generate electricity from the sunlight. Since the intensity of wind and sunlight is not constant, the power output of wind turbines and PV modules fluctuate throughout the day. The electricity demand typically does not vary in accordance with solar and wind variations.

An energy storage system may help to address the issue of variability of solar and wind power to some extent. For example, the variable power from solar and wind power plants can be stored in the energy storage system which can then be used at a later time or at a remote location.

Energy storage systems may also be charged from a power network and could be used to address frequency variations, harmonic suppression, voltage support, and power quality in the power network.

Energy storage systems experience and generate heat. In particular, the greatest amount of heat is generated during charging and discharging of the batteries. If the heat is not removed, the heat accumulates in the battery container and battery life is reduced. Heating, ventilation, and air conditioning (HVAC) systems may be used to control temperatures of energy storage systems. Usually at least one HVAC system is equipped within an enclosed energy storage system for thermal management of multiple racks of energy storage modules distributed spatially in the enclosure. However, there may be significant temperature imbalance among the different racks due to varying external conditions, sun loading, HVAC performance, varying, varying degradation of battery cells, and air flow dead zones in the enclosure. In embodiments wherein the energy storage modules include lithium ion batteries, for example, such batteries normally work optimally at 20 degrees Celsius to 25 degrees Celsius, and the operating at higher temperatures shortens the life and leads to capacity loss. Further, response times to required cooling may sometimes be delayed by heat transfer considerations associated with the large thermal mass of the batteries.

It would be desirable to have improved temperature control of energy storage systems.

BRIEF DESCRIPTION

An energy storage system includes a DC bus; a plurality of battery strings, each battery string comprising batteries coupled electrically together; a plurality of DC/DC converters electrically coupling respective battery strings to the DC bus; an enclosure housing the battery strings and the DC/DC converters; and a temperature control system. The temperature control system includes at least one heating, ventilation, and air conditioning (HVAC) system, and a controller. The controller is programmed to execute a method of predicting heat loads for respective battery strings within the enclosure, wherein the heat loads comprise external heat loads and internal heat loads; determining one or both of DC/DC converter operating commands and HVAC operating commands based on the respective predicted heat loads to control the actual heat loads of the respective battery strings; and operating one or both of the DC/DC converter and the HVAC system in response to at least one of the DC/DC converter operating commands and the HVAC operating commands.

A method for controlling temperature in an energy storage system includes a DC bus; a plurality of battery strings, each battery string comprising batteries coupled together; DC/DC converters electrically coupling respective battery strings to the DC bus; an enclosure housing the battery strings and the DC/DC converters; and at least one heating, ventilation, and air conditioning (HVAC) system. The method includes predicting heat loads for respective battery strings within the enclosure, wherein the heat loads comprise external heat loads and internal heat loads; determining one or both of DC/DC converter operating commands and HVAC operating commands based on the respective predicted heat loads to control the actual heat loads of the respective battery strings; and operating one or both of the DC/DC converter and the HVAC system in response to at least one of the DC/DC converter operating commands and the HVAC operating commands.

A method for controlling temperature in an energy storage system includes a plurality of energy storage devices housed in an enclosure. The method includes obtaining a weather forecast for a region the container is located; measuring a local parameter representative of solar radiation in the vicinity of the container; adjusting the weather forecast based at least in part on the local parameter; determining an operating command based at least in part on the adjusted weather forecast; and operating at least one of the heating, ventilation, and air conditioning (HVAC) components in response to the operating command.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
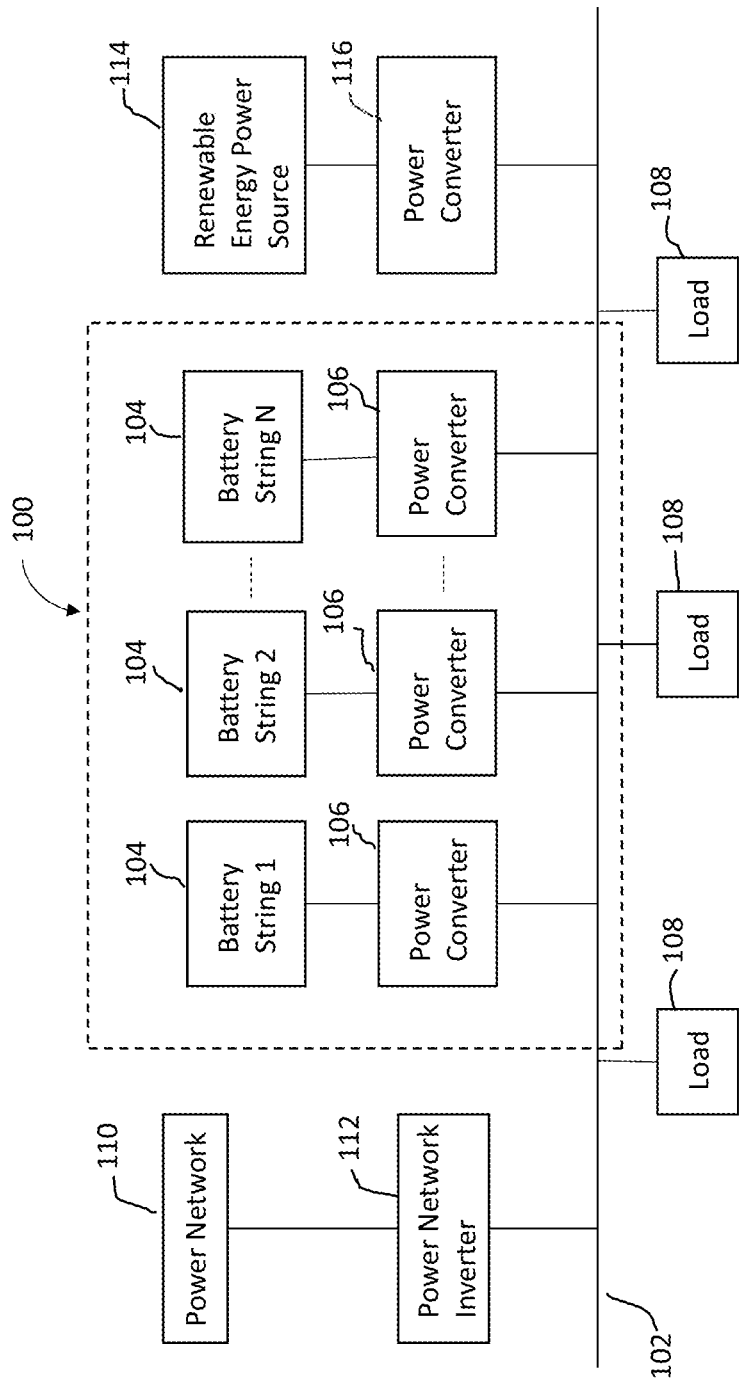
FIG. 1 is a block diagram of an energy storage system coupled to a renewable power generation system and power network in accordance with the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The term "1-n" and the like refers to a plurality of components or devices which may include one component or device to "n" number of components or devices.

Figure 3:
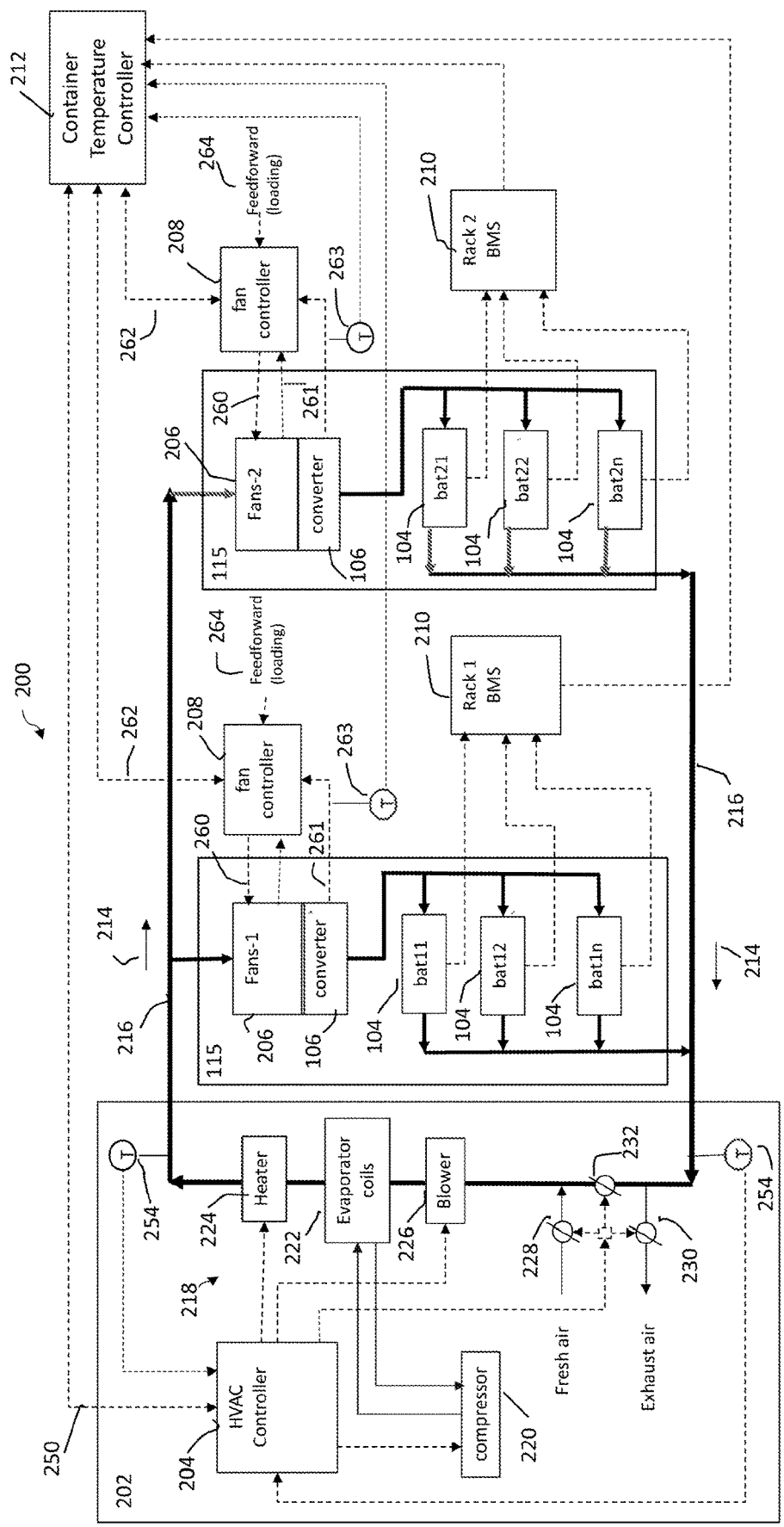
FIG. 3 is a block diagram of an energy storage system including a temperature control system in accordance with the present invention.

FIG. 1 illustrates a DC-coupled energy storage system 100 coupled to a renewable energy power source 114. The energy storage system 100 includes a DC bus 102. A plurality of battery strings 104 is connected to the DC bus 102 through a respective plurality of power converters 106. Each of the battery strings 104 includes a plurality of batteries 120, such as an energy storage module, as shown in FIG. 3, connected in series and/or parallel. The batteries 120 in each battery string 104 may get charged from the DC bus, and/or may provide energy to one or more loads 108 connected to the DC bus. The power converters 106, which may be a DC-to-DC (dc/dc) converter, may charge the battery strings 104 from a power grid/network 110, or a renewable energy power source 114, such as a solar power module. Further, the power converter 106 connected to a battery string 104 can facilitate transfer of energy from one battery string 104 to another battery string 104 and/or from one battery 120 to another battery within one battery string 104. The one or more of plurality of power converters 106 may include a buck converter, a boost converter, a buck-boost converter, a flyback converter or any other suitable dc/dc power converter. Loads 108 can include a car charger, electric drives, lighting loads etc. When a particular load is an alternating current (AC) load a DC-to-AC converter may be used between the DC bus 102 and the AC load(s).

In some implementations, the DC bus 102 of energy storage system 100 may be connected to AC power network or grid 110 via a power network inverter 112. The power network or grid 11 can be a consumer, commercial, and/or utility scale power grid. In some implementations the energy storage system 100 may also be connected to renewable energy power source 114, which can generate energy from one or more renewable energy generation sources (e.g., photovoltaic (PV) panels, wind turbines, geothermal exchanges, or any other renewable energy generation source). The renewable energy power source 114 is connected to the energy storage system via a power converter 116.

In an embodiment where the renewable power module 114 includes PV panels, the renewable power converter 116 may be a PV converter. By controlling the DC bus voltage, batteries in the battery strings 104 may be charged from the power network 110 and/or the renewable power module 114. Moreover, in some embodiments, the battery strings 104 may supply power to the power network 110.

Figure 2:
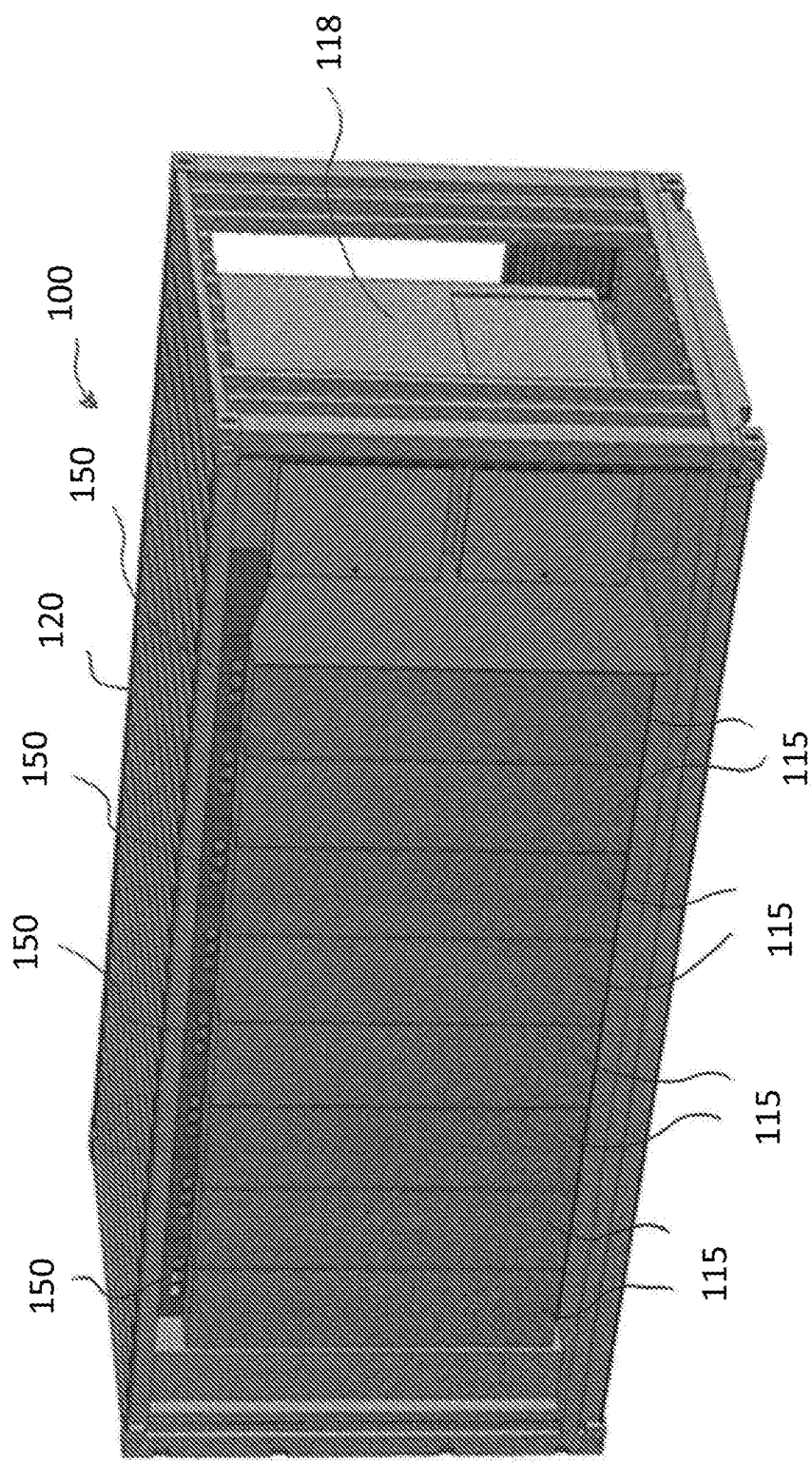
FIG. 2 is a perspective view of an energy storage container including a plurality of battery module strings in accordance with the present invention.

FIG. 2 illustrates an energy storage system 100 according to some embodiments. In the illustrated embodiment, the energy storage system 100 includes a container or enclosure 102 and a plurality of battery module strings 115 installed therein. Each battery module string 115 may include a battery string 104 and a respective power converter 106. As shown in FIG. 2, the container 102 may further include power electronics and/or temperature control equipment 118, such as a heating, ventilation and air conditioning (HVAC) system and one or more fans 150 distributed throughout the enclosure 102, to manage operation and cooling/heating of the battery module strings 115.

FIG. 3 illustrates a schematic block diagram of the temperature control system 200 within an embodiment of the container 102 of an energy storage system 100 similar to that shown in FIG. 2. The temperature control system 200 controls the temperature and management of the circulation of the air flow 152 passing through the container 102 and battery module strings 115. The temperature control system 200 includes a HVAC system 302, HVAC controller or thermostat 204, a plurality of fans 206, a plurality of fan controllers 208, and a plurality of battery management strings (BMS) 210, and a container temperature controller 212. The HVAC system 204 controls the temperature of the cooling fluid 214, for example air, and the volumetric flow rate of the air circulating though the ducts and/or conduits 216 of the container 102. The HVAC system 204 includes HVAC components 218, such a compressor 220, evaporator coils 222, heater 224 and blower 226, to cool and/or heat and to circulate the air 214 throughout the interior of the container 102. The HVAC system 202 also includes an input valve 228 to provide fresh air to the duct or flow path 216, and an outlet valve 230 to remove exhaust air from the duct or flow path. A shut off valve 232 may be disposed within the circulating flow path 216 between the inlet valve 228 and outlet valve 230 to enable the addition of fresh air and the removal of exhaust air from the flow path simultaneously.

The HVAC controller or thermostat 204 programed to execute steps to determine the operating parameters to operate the heater 224, compressor 220, blower 226, and various valves, such as the inlet valve 228, outlet valve 230 and shutoff valve 232, and to provide a corresponding operating command to each of these HVAC components 218, in response to an HVAC temperature setpoint provided at input 250 by the container temperature controller 212, and the temperature of the return air and/or the temperature of the supply air by respective temperature sensors 254.

The plurality of fans 206 of each battery module string 115 within the container 102 are controlled by the respective fan controller 208. The fan controller 208 is programmed to execute steps of determining the fan speed and providing an operating command 260 to each of the fans 206 to control the fan speed in response to one or more of the speed 261 of the respective fan provided by a tachometer, the temperature of the power converter provided by one or more temperature sensors 263, and the converter temperature setpoint 262 provided by the container temperature controller 202. In another embodiment, a feed forward loading signal 264 is provided to the fan controller to control the fan speed. Although fans 150 are shown and discussed for purposes of example, any cooling media may be used. For example, in other embodiments, the energy storage system may be liquid cooled rather than air cooled.

As further shown in FIG. 3, each battery storage module 115 includes a battery management system (BMS) 210 which receives signals indicative of the condition of the batteries or energy storage modules 120, including the temperature, current and wattage of each battery. Based on these temperature measurements, each battery management system 210 provides signals to the container temperature controller 212 including at least one of the median temperature, mean temperature, maximum temperature, and minimum temperature of the batteries 120 of each respect battery module string 104, as best shown in FIG. 1.

The container temperature controller 212 is a supervisory controller to control the HVAC controller 204 and fan controllers 208. The container temperature controller 212 is programmed to execute steps to determine the HVAC temperature setpoint at 250 and the temperature set point bias at 262 for each fan controller 208, which is correspondingly provided to the HVAC controller 204 and fan controllers 208. The HVAC temperature setpoint 250 and temperature set point bias 262 are based in part on the temperatures provided by the HVAC system 202, fan controllers 208 and battery management systems 210. Overall the container temperature controller 212 is programmed to execute the steps of predicting heat loads for respective battery strings 104 within the enclosure 102, wherein the heat loads comprise external heat loads and internal heat loads; determining DC/DC converter 106 operating commands, HVAC 118 operating commands and fan 206 operating commands, or a combination of DC/DC converter, HVAC and fan operating commands based on the respective predicted heat loads to control the actual heat loads of the respective battery strings; and sending the operating commands to the DC/DC converter, the at least one HVAC system, the fans, or the combination of the DC/DC converter, the at least one HVAC system and the fans.

FIG. 3 additionally illustrates, for purposes of example, temperature sensors, fans 206, battery management systems (BMS) 210, fan controllers 208, and an enclosure temperature controller 212 that may be used when coordinating the HVAC components 218. DC/DC converters 106 are useful for the energy storage system 100 but not necessarily required. The fans 206 may be either associated with respective DC/DC converters or independent of DC/DC converters 106. In embodiments without DC/DC converters 106, the operating commands may comprise fan operating commands (such as fan speeds for example) and HVAC operating commands. Although fans 206 are shown and discussed for purposes of example, any cooling media may be used. For example, in other embodiments, the energy storage system 100 may be liquid cooled rather than air cooled.

In the embodiment of FIG. 3 for example, each of the container temperature controller 212, the HVAC controller 204, and the fan controllers 208 may include one or more processor(s) and associated memory device(s) configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and/or other programmable circuits.

Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) may generally be configured to store suitable computer-readable instructions that, when implemented by the processor(s), configure the controllers 212, 204, 208 to perform various functions.

Figure 4:
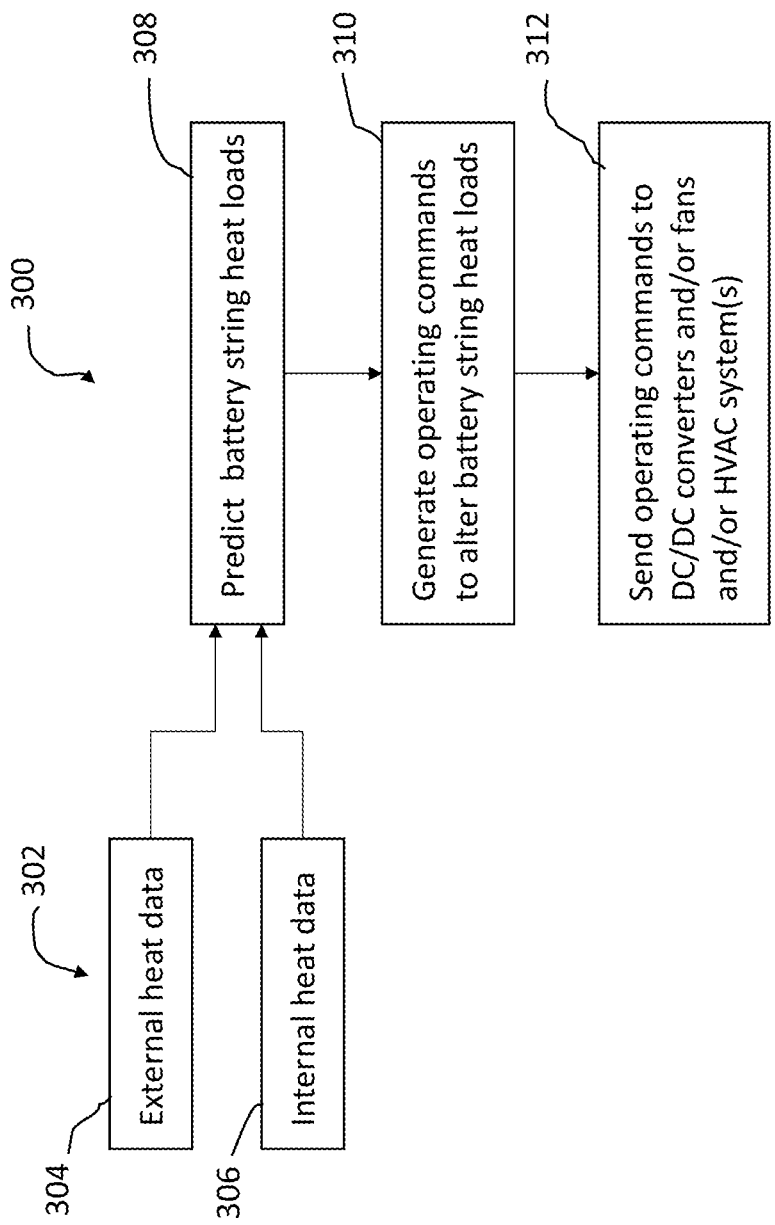
FIG. 4 is a flow chart of a temperature control method for an energy storage system in accordance with the present invention.

FIG. 4 is a flow chart of a temperature control method 300 for an energy storage system 100 in accordance with an embodiment disclosed herein. As referenced above with respect to FIG. 3, the battery string heat loads 302 comprise external heat loads 304 and internal heat loads 306. External heat loads 304 refer to heat loads on the battery strings 104 that result from externally generated sources. For example, the external heat loads 304 may include sun loading, external temperature and wind speed. The external heat loads 304 may be predicted, based at least in part, on at least one of obtaining weather data, obtaining external temperature and wind speed data, using site information, or using enclosure layout information. In some embodiments, the concepts discussed below with respect to FIG. 6 may be used for forecast adjusting when predicting the external heat loads. Depending upon the direction and angle of the sun and the direction and speed of the wind, the location of the enclosure on the site, the orientation of the enclosure, and the physical layout of the site (which may create shading effects from nearby enclosures), for example, some battery strings 104 may experience a higher heat load from sun and/or wind loading than other battery strings within a given enclosure.

Internal heat loads 306, in contrast to external heat loads 304, refer to heat loads on the battery strings 104 that result from internally generated sources. For example, the internal heat loads 306 may comprise battery loads, DC/DC converter loads, fan loads and HVAC loads. Factors which may affect internal heat loads 306 include, for example, battery age, battery degradation, battery charging, battery discharging, HVAC capacity, HVAC degradation, air flow dead zones in the enclosure, fan degradation, fan capacity, DC/DC converter status, or DC/DC converter aging. Batteries of the battery strings 104 generate heat when charging and discharging, and older batteries generate more heat when charging or discharging than newer batteries. Similarly, degraded batteries generate more heat than healthy batteries. If an enclosure has air flow issues in any region, battery strings in that region may receive less cooling air from the HVAC system(s) 202. Furthermore, if an HVAC system 202 or fan 206 has a low capacity or is degraded, then the amount of loading it may compensate for is reduced. With smart predictive control battery degradation can be reduced which reduces overall project life cycle costs by extending battery life.

Heat load prediction, as shown in step 308, may be accomplished by any suitable technique. The internal heat load 306 is generated by the characteristics, condition and/or operation of the internal components of the energy storage system 100. For example, the heat load 306 generated by a battery string 104 during charging and discharging may be predicted using a time-related first principle model, an empirical model, or a data driven model. An example of a data driven model is a time-series prediction model based on historical data in each battery string 104. Further, the external heat load 304 generated by external sources, such as the sun loading, ambient temperature, and wind loading, may be predicted by the weather forecast throughout the day.

With continued reference to FIG. 4, after the battery string heat loads 306 are predicted, operating commands are generated to alter the battery string heat loads as shown in step 310. These commands will typically result in at least some of the actual heat loads being less than at least some of the respective predicted heat loads, and these commands will typically be generated for at least two of the DC/DC converters 106, the fans 206, or the HVAC system(s) 118. However, in certain embodiments, the commands may be generated for and provide to one of the DC/DC converters, the fans, and the HVAC system(s) and not the others as shown in steps 310 and 312.

One example of potential operating commands is a fan operating command. When DC/DC converters 106 are cooled by fans 206 with the air then being directed across respective battery strings 104, one example of fan operating commands relates to the speeds of those fans. Operating some fans 206 at higher speeds than other fans will result in more cooling air being directed to the respective battery string or strings 104 receiving downstream air from the fans. Fan speed may be used independently if either the fans are situated independently of the DC/DC converters or if there are no DC/DC converters in the energy storage system 100.

In addition to the fan speed, another example of potential operating commands relates to DC/DC converter switching signals. When more power is extracted from or absorbed by certain battery strings 104, those battery strings will create more heat than other battery strings. For example, determining the DC/DC converter operating commands may comprise determining DC/DC converter switching signals to redistribute battery string loading to avoid degradation of at least one battery string 104 having a higher predicted heat load than at least one other battery string. For example, the battery string 104 with the higher predicted heat load may be controlled so as to charge or discharge at a lower rate than the battery string with the lower predicted heat load. As another example, which may be useful in situations when the HVAC system 118 and/or fans 150 are compromised, determining the DC/DC converter operating commands comprises determining DC/DC switching signals to increase a battery string load on one or more battery strings 104 for a first period of time and then increase a battery string load on one or more different battery strings for a second period of time. In this manner the increase in temperature of a given string is temporary such that the battery string 104 may recover somewhat during the time its load is reduced.

In a more specific example, when predicting the heat loads is based at least in part on sun loading 304, DC/DC operating commands may be designed to generate a lower battery string load on a first battery string 104 situated in a first portion of the enclosure 102 more impacted by the sun loading 304 relative to a second battery string in a second portion of the enclosure. Then, once the sun loading 304 shifts away from the first portion of the enclosure 102, DC/DC operating commands may be used to increase the battery string 104 load on the first battery string as the temporary external heat 304 increase has been abated. This concept is also applicable to wind loading whereby the wind may impact a particular side of the enclosure 102 depending on the direction of the wind.

Thermal transient times for different battery strings 104 may be different based on their spatial distribution in the enclosure 102 and on their distance from the air opening of the HVAC system 118 and locations of the fans 150, for example. As a specific example, the battery string 104 farthest from the HVAC system(s) 118 and/or the fans 150 may have a longer cooling response time due to higher air flow transport time, less thermal interaction from other battery strings 104, and being closer to the exterior wall of the enclosure 102. The DC/DC converter 106 for that battery string 104 may be controlled to charge/discharge in a lower rate to maintain a relatively flat temperature profile.

Figure 5:
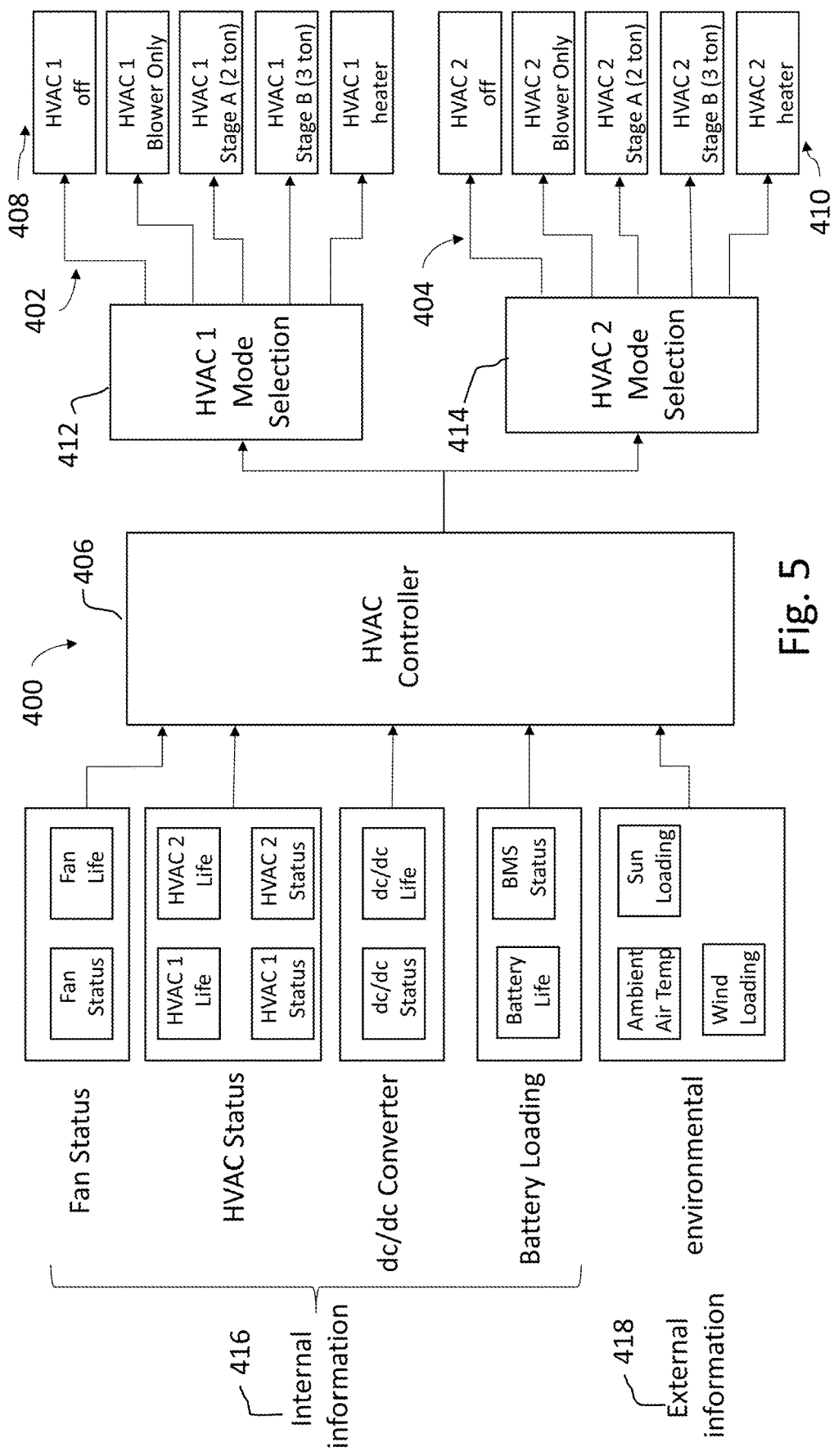
FIG. 5 is a block diagram of a method for managing two HVAC systems in accordance with an embodiment disclosed herein.

FIG. 5 is a block diagram of a method for predictively managing two HVAC systems 402, 404 in accordance with an embodiment disclosed herein. This figure shows some of the internal and external factors discussed above that affect battery string heat load. FIG. 5 also shows an HVAC system 400 having at least a pair of HVAC systems (HVAC1, HVAC2) 402, 404 controlled by a HVAC controller 406. With respect to HVAC operating commands, these commands typically comprise predicting levels of heating or cooling for each HVAC system 402, 404 based on the internal information 416 and the external information 418. Such levels (or "modes") 408, 410 are shown in FIG. 4, for example, as a given HVAC system 402, 404 may have settings such as off, blower only, cooling stage a (or "set point"), cool stage b (or "maximum"), and heater. An advantage of having multiple HVAC systems 402, 404 is that, in addition to providing some back up in the event of one being down, when multiple HVAC systems are available, a more granulated level of cooling is available. For example, HVAC system 1 402 could be operating at a set point while HVAC system 2 404 is operating at maximum. Based on the internal and external information the HVAC controller 406 selects the level or mode 408, 410 at steps 412 and 414 respectively of each HVAC system 402, 404 thereby generating system specific commands for controlling the individual components (such as the blower 226 and compressor 220 shown in FIG. 3).

If desired, economic considerations may additionally be considered when determining HVAC operating commands. For example, such considerations may include higher value during peak hours and/or nighttime consumption avoidance. In other words, pre-cooling may be started with a timing designed to use less expensive energy for powering the HVAC systems 402, 404.

When an HVAC system 402, 404 is degraded, pre-cooling may also be useful. In such situations, the HVAC operating commands may start the HVAC system earlier and/or run the HVAC at a higher rate earlier. Furthermore, when one HVAC is degrading faster than another HVAC system, then the operating commands for the healthier HVAC may be higher than the degraded HVAC so as to minimize the field trips for overhaul, maintenance or replacement.

Figure 6:
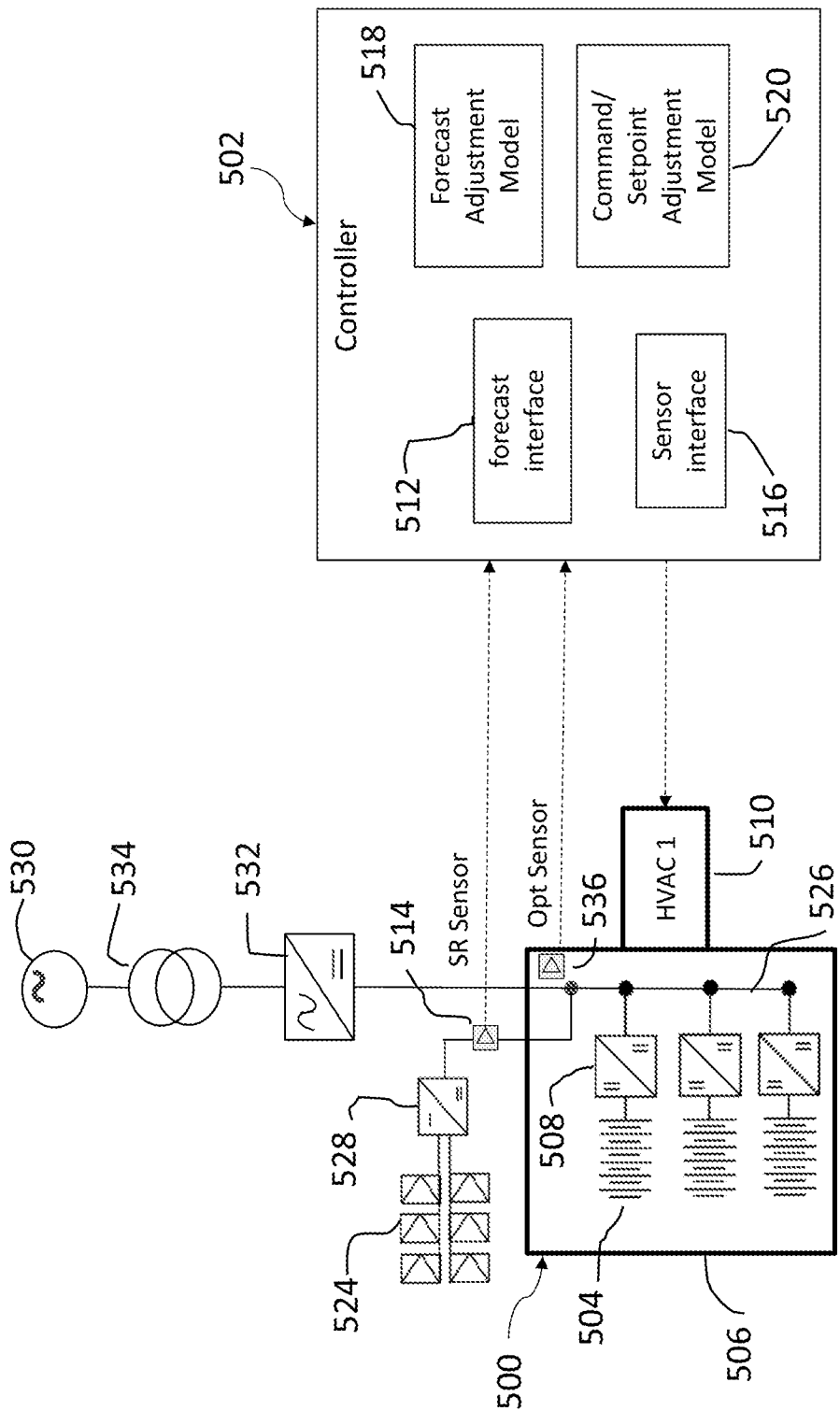
FIG. 6 is a block diagram of an energy storage system and controller in accordance with the present invention.

FIG. 6 is a block diagram of an energy storage system 500, similar to that shown in FIG. 1, and a controller 502 in accordance with an embodiment disclosed herein. A plurality of energy storage devices 504 (shown for purposes of example as batteries) are housed in a container 506 optionally along with other related equipment such as DC/DC converters 508). A temperature control system 510 includes a heating, ventilation, and air conditioning (HVAC) components and the controller 502 programmed to execute the steps of obtaining a weather forecast for a region where the container 506 is located through the forecast interface 512, for example, measuring a local parameter representative of solar radiation by a sensor 514 in the vicinity of the container 506 through a sensor interface 516, for example, adjusting the weather forecast based at least in part on the local parameter through the forecast adjustment model 518, for example, determining an operating command based at least in part on the adjusted weather forecast through the command/setpoint adjustment model 520, for example, and sending the operating command to at least one of the HVAC components at line 522. A period of the weather forecast that is to be adjusted typically ranges from one hour ahead to six hours ahead, for example.

The embodiment of FIG. 6 also illustrates a plurality of solar panels 524 coupled to a DC bus 526 through an optional MPPT (maximum power point tracking) DC/DC converter 528, and the DC bus providing generated and stored power to a grid 530 through a DC/AC inverter 532 and a transformer 534 for purposes of example. Although one set of solar panels 534 and batteries 504 is shown in FIG. 6, multiple sets may be deployed if desired.

A solar radiation related sensor 514 and an optional additional parameter sensor 536 are also shown in FIG. 6. The solar radiation related sensor 514 may comprise one or more current and voltage sensors used for measuring a voltage and a current from a solar panel 524 coupled to the energy storage system 500. The solar panel 524 is located in the vicinity of the container 506 such as adjacent or on top of the container, for example.

The controller 502 used for temperature control purposes may be a standalone controller or may be integrated with general power conversion and other system controls (not shown).

Figure 7:
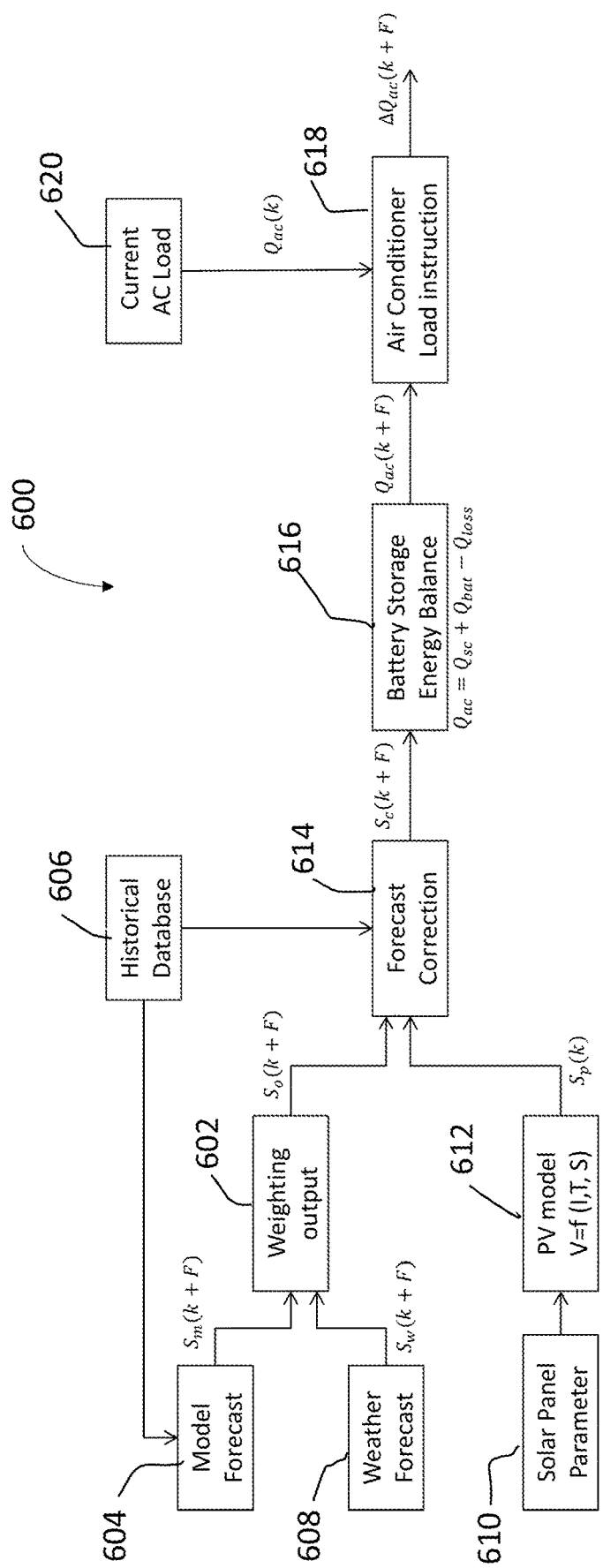
FIG. 7 is a block diagram of a temperature control method based on solar radiation in accordance with the present invention.

FIG. 7 illustrates a block diagram of a temperature control method 600 based on solar radiation in accordance with an embodiment disclosed herein. In temperature control method 600, the weather forecast prediction (So) 602 is obtained by a model (Sm) 604 based both on historical data 606 and currently available weather forecast information (Sw) 608. Historical data 606 may include HVAC prior performance and/or specification of the HVAC, and other parameters of the energy storage system 100. Historical data 606 is supplied to the model forecast 604 which then generates a model solar radiation estimate at a point in time of k+F, where k is the present and F is the number of hours into the future, for example 1 to 6 hours into the future. Similarly, the currently available based solar radiation estimate 608 is generated for that same time period. Such weather forecast 608 may be based on present time data from the internet or weather services for example via the forecast interface 512 of FIG. 6. Although not shown, in some embodiments, such currently available based forecast 608 may further be based on other conditions such as wind speed and cloud cover.

The model forecast 604 and currently available forecast 608 are combined in the forecast prediction block 602 to arrive at the weather forecast prediction (So). In one embodiment a weighting is used to assign more weight to the forecast with the higher confidence value based on previous performance of the model 604 versus the currently available weather forecast 608. Although both inputs are shown, in some embodiments only one of the two inputs may be used. If one of the two inputs are missing, then the weight would be fully on the available input.

As discussed above, current time obtained solar irradiation data Sp(k) 610 is then used to adjust the forecast prediction 602 in the forecast correction block 614 (which is discussed below with reference to FIG. 9). In one embodiment, such solar irradiation data 610 is obtained by the solar panel voltage and current sensors 514 discussed in FIG. 6. As also discussed below with respect to FIG. 9, current time solar irradiation may be inferred from those measured parameters in the photovoltaic (PV) model block 612.

The adjusted weather forecast Sc(k+F) is then sent to the Battery Storage Energy Balance block 616 wherein it is determined what heat load will need to be removed from the container 506. The heat to be removed (Qac) is the sum of the heat generated by the solar radiation (Qsc) and the heat generated by the energy storage devices (Qbat) minus the heat that is lost (Qloss). The energy balance block 616 used here is for illustration purpose only. In other embodiments, the block to infer Qac from Sc may comprise a data-driven model based on historical operating data, an empirical model based on operating experience, or other physics-based models, for example.

Finally, the HVAC command 618 (shown in FIG. 7 as an air conditioner load instruction) is generated and sent. In the example of FIG. 7, the needed cooling is compared with the current cooling 620, and the difference is supplied to the air conditioner unit. This command is for purposes of example only. In another embodiment, for example, the command may comprise a temperature set point which is supplied to the HVAC components and used for component control.

Figure 8:
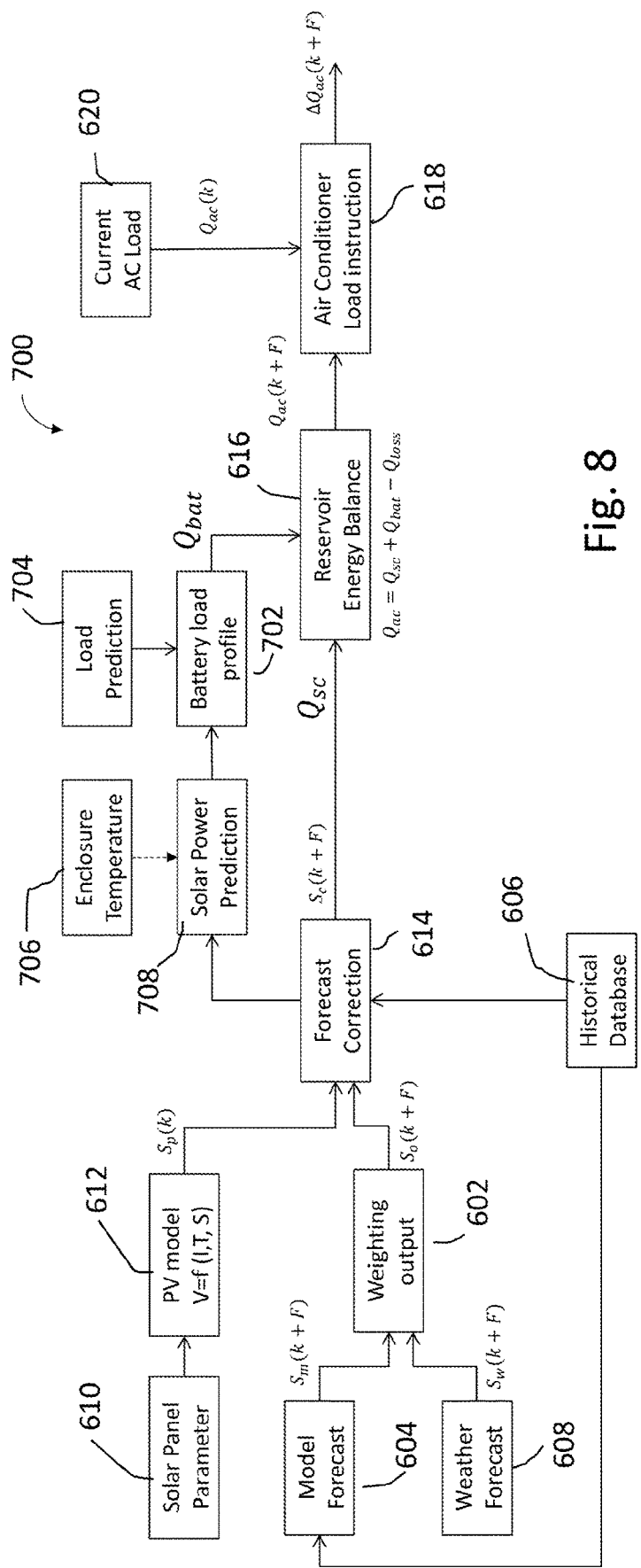
FIG. 8 is a block diagram of a temperature control method based on solar radiation and load predictions in accordance with the present invention.

FIG. 8 is a block diagram of a temperature control method 700 based on solar radiation and load predictions in accordance with an embodiment disclosed herein. The embodiment of FIG. 8 is similar to the temperature control method 600 of FIG. 7, but further includes obtaining a load profile (Qbat) 702 of the energy storage devices or batteries 504, as shown in FIG. 6; and using that load profile 702 in combination with the forecast adjustment Sc(k+F) when determining the HVAC operating command 618. Note that function or steps having the same reference number perform the same function or step previously described.

Figure 10:
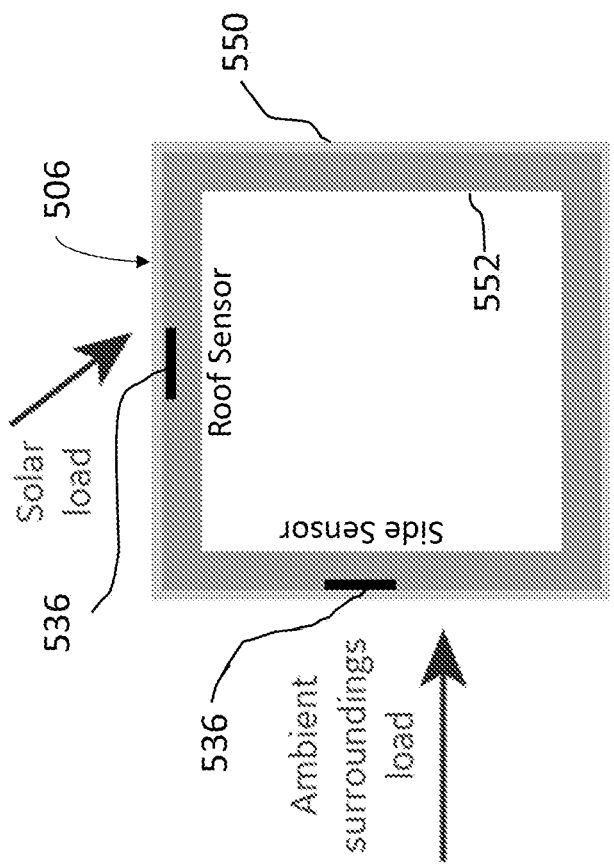
FIG. 10 is a block diagram of an additional sensor in accordance with the present invention.

In the embodiment of FIG. 7, a constant battery load profile (Qbat) was assumed. In the embodiment of FIG. 8, the accuracy of the amount of heat that is needed to be removed (Qac) is increased by using a load profile 702 and load prediction 704. In one embodiment this is done by obtaining information about the predicted power 702 to be generated by the solar modules or batteries 504 of FIG. 6 and the predicted load 704 to be required from the solar modules 524 and energy storage devices 504. For example, load forecast may be determined based on time, weather conditions, customer types, distribution system conditions, and/or historical data with several such techniques being described in commonly assigned Krock et al., U.S. Pat. No. 8,886,362, which is incorporated herein by reference. As shown in FIG. 10 optional temperature sensors 536 may provide the temperature of the enclosure wall resulting from environmental or external conditions, such as thermal changes due to solar load and/or ambient surroundings load. These enclosure temperature parameters 706 may be used to further adjust the solar power prediction 708.

Figure 9:
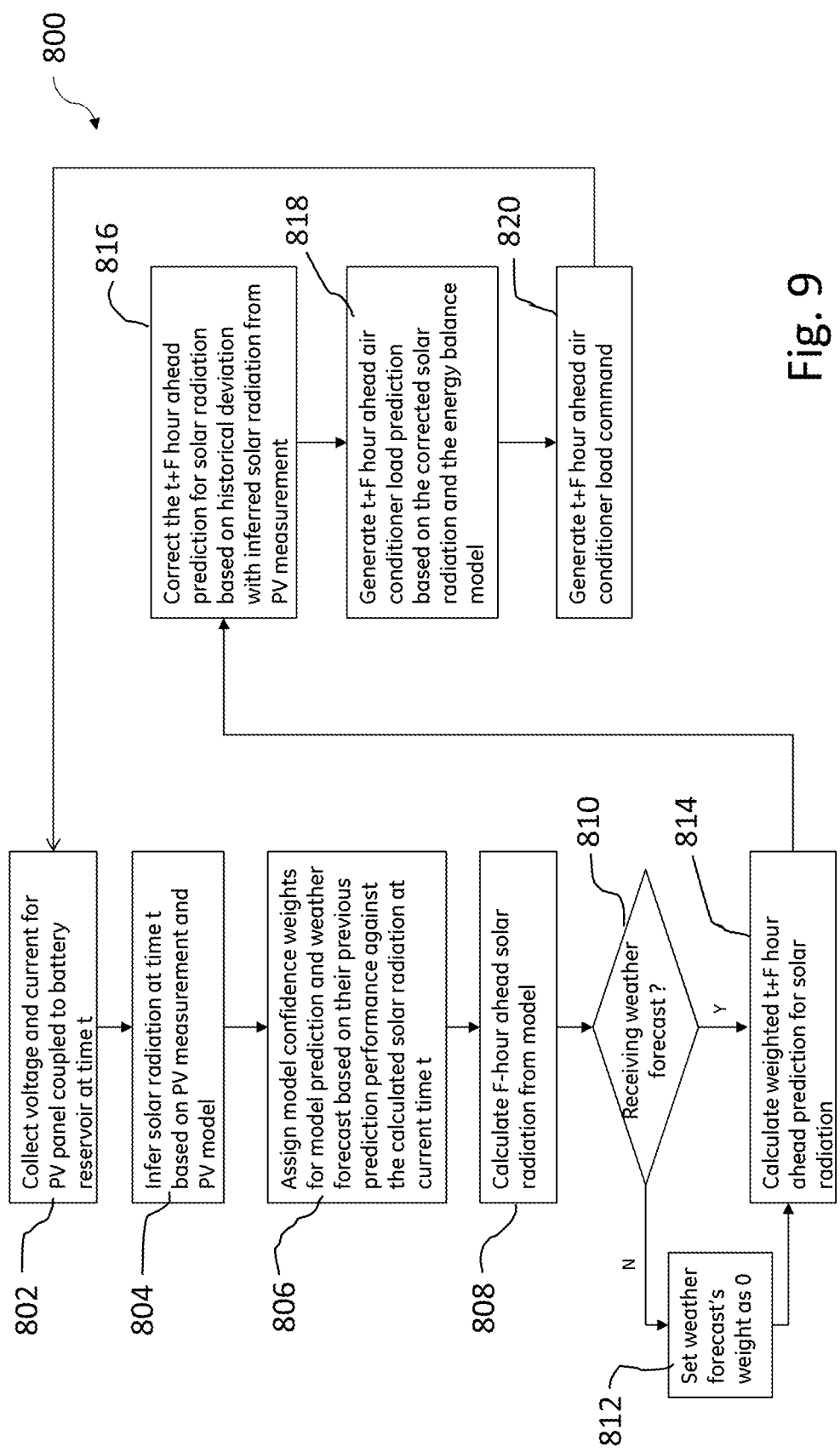
FIG. 9 is a flowchart of a temperature control method based on solar radiation and load predictions in accordance with the present invention.

FIG. 9 is a flowchart of a temperature control method 800 based on solar radiation and battery load predictions in accordance with an embodiment disclosed herein. The steps need not occur in the exact order shown. For example, the voltage and current collection in step 802 may occur at the same time as the assigning of the model confidence weights in step 806.

Referring more specifically to FIG. 9, voltage and current information is collected from a PV panel coupled to the batteries at time t in step 802. The voltage and current information is then used in combination with a photovoltaic (PV) model to infer solar radiation at time t in step 804. Below are several equations which can be simultaneously solved to arrive at the radiation.

$$I_{pv} = n_p I_{ph} - n_p I_{sat} \times \left[ \exp\left( \left(\frac{q}{AkT}\right)\left(\frac{V_{pv}}{n_s} + I_{pv} R_s\right) \right) - 1 \right]$$

$$I_{ph} = (I_{sso} + k_i(T - T_r)) \cdot \frac{S}{1000}$$

$$I_{sat} = I_{rr} \left(\frac{T}{T_r}\right)^3 \exp\left( \left(\frac{qE_{gap}}{kA}\right) \cdot \left(\frac{1}{T_r} - \frac{1}{T}\right) \right)$$

wherein Ipv represents current generated from the solar panel, Iph represents photocurrent, Isat represents module reverse saturation current, np represents number of cells in parallel, q represents electron charge (1.6×10-19 C), A represents an ideality factor, k represents the Boltzman constant (1.38×10-23 J/K), T represents surface temperature of the solar panel with Kelvin as unit, Vpv represents voltage across the solar panel, ns represents number of cells in series, Rs represents series resistance of a PV cell, Isso represents short circuit current, ki represents the short circuit current temperature coefficient, Tr represents a reference temperature, S represents solar radiation level (0-1000 W/m2), Irr represents reverse saturation current at Tr, and Egap represents Energy of the band gap for silicon (1.1 eV).

In a forecast prediction preparation step, confidence weights for model prediction and currently available weather forecast are assigned based on their previous prediction performance against the calculated solar radiation at current time t in step 806.

A prediction is made or determined of the solar radiation at F hour in the future from the weather model in step 808. If there is any currently available weather forecast data in step 810, then the weighting is used when arriving at the combined forecast prediction in step 814. If there is no available weather forecast data in step 812, then the weight for that aspect is zero.

The forecast prediction at step 814 is then adjusted by correcting the t+F hour ahead prediction for solar radiation based on historical deviation with the inferred solar that was inferred from the PV voltage and current measurements at step 816. One equation which may be used is as follows:

$$S_c(k+F) = S_o(k+F) + \alpha_1 \cdot [S_p(k) - S_o(k)] + \alpha_2 \cdot [S_p(k-1) - S_o(k-1)] + \ldots + \alpha_n \cdot [S_p(k-n) - S_o(k-n)]$$

wherein Sc represents the adjusted forecast, So represents the forecast prediction prior to adjustment by the solar irradiation information, Sp represents the solar radiation inferred based on the real time measurements, k represents the present time, F represents a period of time in the future, and the alpha multipliers are constants (or "forgetting factors") that become progressively smaller.

Lastly the determination of needed loads for removing the predicted heat is determined at step 820 (as discussed above with respect to FIGS. 7 and 8, for example) and one or more commands are sent to the HVAC components. As discussed above, one straight forward command is a heat load adjustment command. An alternative is to determine a new temperature setpoint for the HVAC which could use a commonly used feedback control together with the forecasted load as a feedforward signal.

In some embodiments, the temperature control method further comprises measuring an additional local parameter representative of temperature in the vicinity of the container 506 via the optional sensor 536 in FIG. 6, and determining a timing of sending the operating command based at least in part on the additional load parameter. For example, the optional sensor 536 may be used to obtain a current and/or a voltage associated with the plurality of energy storage devices or batteries 504. This sensor 536 may also represent the battery loading and indicate immediate heat release information which can also be incorporated as a feedforward signal for the temperature control loop.

In another example, the optional sensor 536 in FIG. 6 includes a temperature sensor. FIG. 10 is a block diagram of an additional sensor in accordance with another embodiment disclosed herein. FIG. 5 depicts a sectional side view of top, sides, and bottom the enclosure 506 for the energy storage devices 504 wherein an outer layer comprises a metal 550 such as steel, and an inner layer 552 comprises an insulator such as fiberglass or polystyrene foam. FIG. 10 illustrates two sensors 536, but one sensor embodiments are also applicable. As shown a sensor 536 may be disposed on the inner surface of the top wall between the insulation 552 and the top wall which advantageously measures temperature changes resulting from the solar load. Similarly, a sensor 536 may be disposed on the inner surface of a side wall between the insulation 552 and the side wall which advantageously measures temperature changes resulting from the ambient surroundings load. When the data from the sensor 536 between the metal and the insulator shows a change due to external conditions, there is a time period before which that change will propagate through the insulator 552 which can be factored into the timing of the control signal or setpoint comment.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. An energy storage system comprising:
   a DC bus;
   a plurality of battery strings, each battery string comprising batteries coupled electrically together;
   a plurality of DC/DC converters electrically coupling respective battery strings to the DC bus;
   an enclosure housing the battery strings and the DC/DC converters; and
   a temperature control system comprising:
      a heating, ventilation, and air conditioning (HVAC) system; and
      a controller programmed to execute a method of:

predicting future heat loads for respective battery strings within the enclosure, wherein the future heat loads comprise external heat loads and internal heat loads;

determining DC/DC converter operating commands and HVAC operating commands based on the respective predicted future heat loads to control the actual heat loads of the respective battery strings; and operating the DC/DC converter in response to the DC/DC converter operating commands and the HVAC system in response to the HVAC operating commands.

2. The energy storage system of claim 1 wherein the external heat loads comprise at least one of sun loading, wind loading and external temperature, the internal heat loads comprise at least one of battery loads and HVAC loads, and the determining one or both of DC/DC converter operating commands and HVAC operating commands includes:

determining the DC/DC operating commands to redistribute battery string loading to avoid degradation of at least one battery string having a higher predicted heat load than at least one other battery string, and determining HVAC operating commands to provide pre-cooling for at least one portion of the enclosure.

3. A method for controlling temperature in an energy storage system comprising a DC bus; a plurality of battery strings, each battery string comprising batteries coupled together; DC/DC converters electrically coupling respective battery strings to the DC bus; an enclosure housing the battery strings and the DC/DC converters; and a heating, ventilation, and air conditioning (HVAC) system, the method comprising:

predicting future heat loads for respective battery strings within the enclosure, wherein the heat loads comprise external heat loads and internal heat loads;

determining DC/DC converter operating commands and HVAC operating commands based on the respective predicted future heat loads to control the actual heat loads of the respective battery strings; and operating the DC/DC converter in response to the DC/DC converter operating commands and the HVAC system in response to the HVAC operating commands.

4. The method of claim 3 wherein the external heat loads comprise at least one of sun loading, wind loading and external temperature.

5. The method of claim 4 wherein predicting the future heat loads is based at least in part on at least one of obtaining weather data, obtaining external temperature data, using site information, or using layout information.

6. The method of claim 4 wherein the internal heat loads comprise battery loads and HVAC loads.

7. The method of claim 6 wherein the predicting the future heat loads is based at least in part on at least one of battery age, battery degradation, battery charging, battery discharging, HVAC capacity, HVAC status, HVAC degradation, air flow dead zones in the enclosure, DC/DC converter status, or DC/DC converter aging.

8. The method of claim 3 wherein the energy storage system further comprises DC/DC converter fans, and wherein determining the DC/DC converter operating commands comprises determining at least one of DC/DC converter fan speeds or DC/DC converter switching signals.

9. The method of claim 3 wherein determining DC/DC converter operating commands comprises determining DC/DC converter switching signals to redistribute battery string loading to avoid degradation of at least one battery string having a higher predicted heat load than at least one other battery string.

10. The method of claim 9 wherein determining the DC/DC converter operating commands comprises determining DC/DC switching signals to increase a battery string load on one or more battery strings for a first period of time and then increase a battery string load on one or more different battery strings for a second period of time.

11. The method of claim 3 wherein determining the HVAC operating commands comprises determining levels of heating or cooling for first HVAC system and a second HVAC system.

12. The method of claim 3 wherein predicting the future heat loads is based at least in part on sun loading.

13. The method of claim 12 wherein determining DC/DC converter operating commands comprises determining DC/DC operating commands to generate a lower battery string load on a first battery string situated in a first portion of the enclosure more impacted by the sun loading relative to a second battery string in a second portion of the enclosure.

14. The method of claim 3 wherein determining the HVAC operating commands comprises, when at least one HVAC system is degraded, determining HVAC operating commands to start the HVAC system earlier or to run the HVAC at a higher rate earlier.

15. A method for controlling temperature in an energy storage system having a plurality of energy storage devices housed in a container; the method comprising:

obtaining a weather forecast for a region the container is located;

measuring a local parameter representative of solar radiation in the vicinity of the container;

adjusting the weather forecast based at least in part on the local parameter;

predicting future heat loads of the energy storage devices within the container based on the adjusted weather forecast;

determining an operating command for at least heating, ventilation, and air conditioning (HVAC) components of an HVAC system based at least in part on the predicted future heat loads; and operating at least one of the HVAC components in response to the operating command.

16. The method of claim 15 wherein measuring the local parameter comprises measuring a voltage and a current from a solar panel coupled to the energy storage system.

17. The method of claim 16 wherein obtaining the weather forecast comprises using a model based on historical data, using publicly available weather forecast information, or using a combination of a model based on historical data and publicly available weather forecast information.

18. The method of claim 15 wherein obtaining the weather forecast comprises using a model based on historical data, and further including adjusting the weather forecast by calibrating the model.

19. The method of claim 15 further comprising obtaining a load profile of the energy storage devices, and wherein determining the operating command is further based at least in part on the load profile.

20. The method of claim 15 further comprising measuring an additional local parameter, the additional local parameter representative of temperature in the vicinity of the container, and determining a timing of sending the operating command based at least in part on the additional local parameter.

21. The method of claim 20 wherein the additional local parameter comprises a temperature obtained from a sensor located between exterior and interior portions of a wall of the container.

22. The method of claim 21 wherein the wall comprises a top wall or a side wall, wherein the exterior portion of the wall comprises a thermally conductive material, and wherein the interior portion of the wall comprises a thermally insulated material.

23. The method of claim 16 wherein measuring the local parameter comprises measuring a voltage and a current from the solar panel situated on top of the container.

* * * * *